(12) United States Patent
Ohtomo et al.

(10) Patent No.: US 6,881,926 B2
(45) Date of Patent: Apr. 19, 2005

(54) LASER IRRADIATING SYSTEM (75) Inventors: Fumio Ohtomo, Tokyo-to (JP); Jun-ichi Kodaira, Tokyo-to (JP)

(73) Assignee: Kabishiki Kaisha TOPCON, Tokyo-to (JP)

( * ) Notice: Subject to any disclaimer, the term of this patent is extended or adjusted under 35 U.S.C. 154(b) by 18 days.

(21) Appl. No.: 10/615,061

(22) Filed: Jul. 8, 2003

(65) Prior Publication Data

US 2004/0050830 A1 Mar. 18, 2004

(30) Foreign Application Priority Data

Jul. 10, 2002 (JP) .................................... 2002-201787

(51) Int. Cl.[7] .............................................. B23K 26/06
(52) U.S. Cl. ............................ 219/121.73; 219/121.75
(58) Field of Search ..................... 219/121.73, 121.75, 219/121.74, 121.6

(56) References Cited

U.S. PATENT DOCUMENTS

| | | | | | |
|---|---|---|---|---|---|
| 4,830,489 A | * | 5/1989 | Cain et al. | ..................... | 356/73 |
| 5,137,354 A | * | 8/1992 | deVos et al. | ............. | 356/141.3 |
| 5,784,155 A | * | 7/1998 | Ohtomo et al. | .......... | 356/141.1 |
| 5,898,490 A | * | 4/1999 | Ohtomo et al. | .......... | 356/141.3 |
| 5,898,809 A | * | 4/1999 | Taboada et al. | ............ | 385/115 |
| 6,011,613 A | * | 1/2000 | Ohtomo et al. | ............ | 356/4.08 |
| 6,677,938 B1 | * | 1/2004 | Maynard | ..................... | 345/419 |

* cited by examiner

Primary Examiner—M. Alexandra Elve
(74) Attorney, Agent, or Firm—Nields & Lemack (57) ABSTRACT

A laser irradiating system, comprising a light source for emitting a laser beam in elliptical shape, a light source holder for holding the light source, a base for rotatably supporting the light source holder, a first driving unit for rotating the light source holder, a deflecting optical means for deflecting the laser beam from the light source in a direction perpendicular to an optical axis, a rotator holder for holding the deflecting optical means and being rotatable around the optical axis of the light source, a cylindrical lens being arranged so that a center of the cylindrical lens is aligned with the optical axis and the laser beam from the deflecting optical means enters perpendicularly to the optical axis and for diffusing the transmitting laser beam to a fan-shaped laser beam, a control unit for controlling the first driving unit and a receiver for receiving a signal for remote-control operation, wherein an irradiating direction of the fan-shaped laser beam can be operated in remote control operation by the control unit based on a command signal received by the receiver.

7 Claims, 6 Drawing Sheets

LASER IRRADIATING SYSTEM

BACKGROUND OF THE INVENTION

The present invention relates to a laser irradiating system, and in particular, to a simplified type laser irradiating system using a rod lens and for irradiating a laser beam in fan-like shape.

A laser irradiating system is used for the purpose of forming a reference plane in building and construction work and civil engineering work. As a simplified type laser irradiating system, a laser irradiating system is known, which uses a rod lens and forms a reference line and a reference plane by irradiating a fan-shaped laser beam. The laser irradiating system as described above is a simplified type laser irradiating system used for the purpose such as room interior finishing work. The irradiating unit can be rotated or the laser irradiating system itself can be rotated so that the irradiation position can be shifted to cope with the working position.

Figure 10:
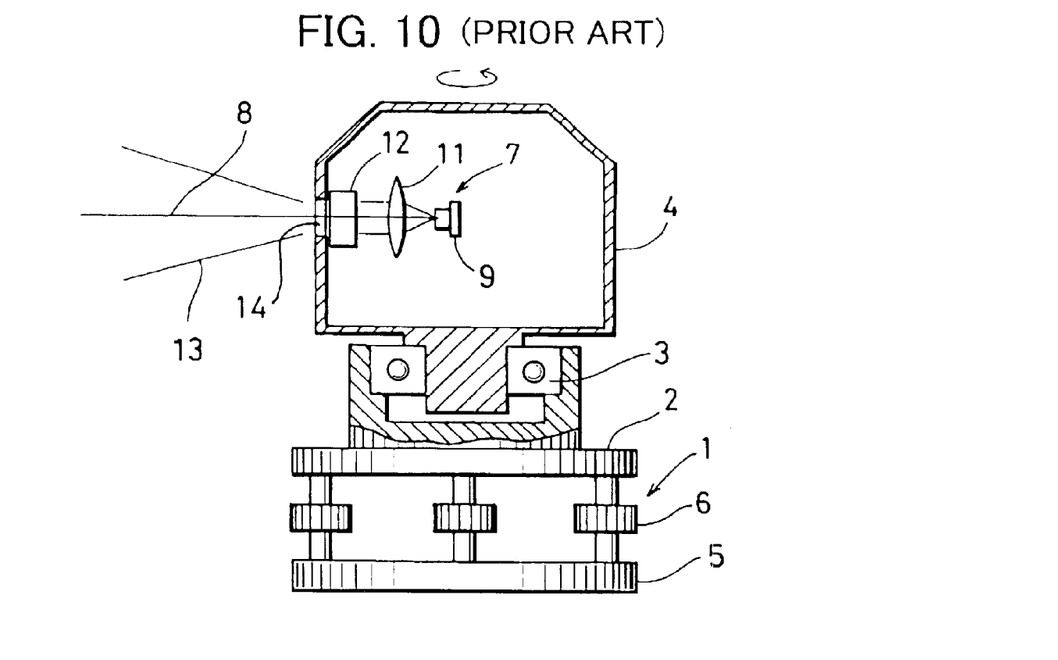
FIG. 10 is a partially cutaway sectional view of a conventional system.
Figure 11:
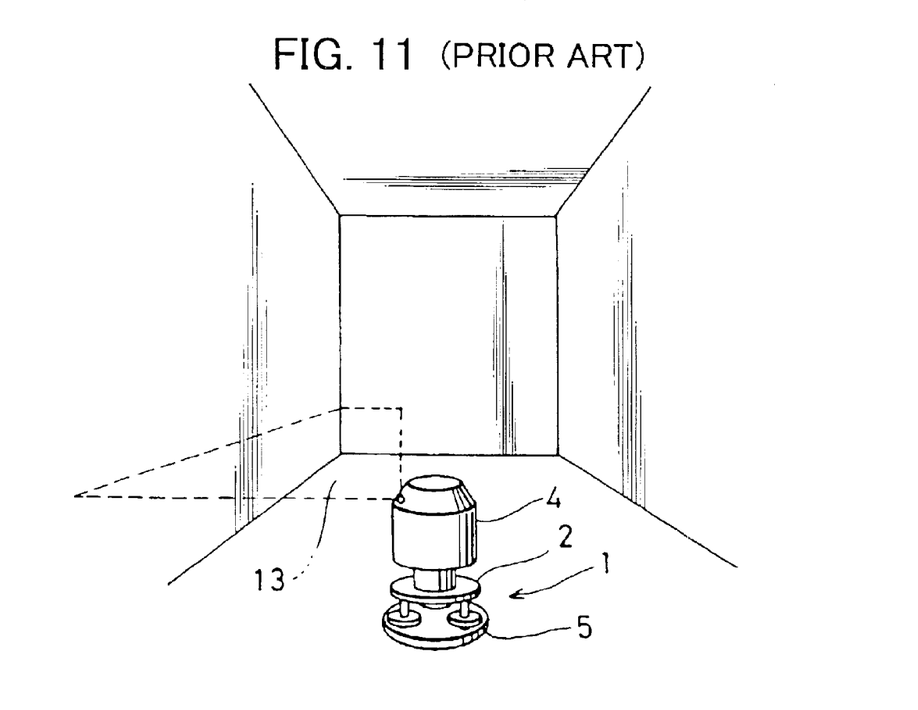
FIG. 11 is a perspective view to explain operation of the conventional system.

Description will be given on a conventional type laser irradiating system referring to FIG. 10 and FIG. 11.

A base unit 2 is mounted on a leveling base 1, and a housing 4 is rotatably mounted on the base unit 2 via bearings 3.

The leveling base 1 comprises a pedestal 5 and three leveling screws 6. By turning the leveling screws 6 at adequate positions, horizontal positioning of the base unit 2 can be carried out.

A laser beam irradiating unit 7 is provided inside the housing 4. The laser beam irradiating unit 7 has an irradiation optical axis 8 perpendicularly crossing a rotation axis of the housing 4, and the laser beam irradiating unit 7 comprises a light emitting source 9 such as a diode laser for emitting a laser beam 13 on the irradiation beam optical axis 8, a collimator lens 11 for turning the laser beam 13 emitted from the light emitting source 9 to a parallel beam, and a rod lens 12 having an optical axis perpendicularly crossing an optical axis of the collimator lens 11 and perpendicularly crossing the rotation axis of the housing 4.

The laser beam 13 emitted from the light emitting source 9 is turned to a parallel beam by the collimator lens 11. The laser beam 13 is then spread in a horizontal direction by the rod lens 12 and is irradiated through a light projecting window 14 of the housing 4. To facilitate the explanation, the laser beam 13 is shown by spreading it in an up-to-bottom direction in FIG. 10.

The laser beam 13 is spread in a horizontal direction and is irradiated as a fan-shaped laser beam, and forms a horizontal reference plane. A spreading angle of the laser beam 13 is about 100°. When the working position is deviated from the horizontal reference plane, the housing 4 is manually rotated as appropriate. That is, by rotating the housing 4, a horizontal reference plane formed by the laser beam for total circumference can be obtained.

In the laser irradiating system as described above, the reference line and the horizontal reference plane formed by the laser irradiating system must be shifted with the progress of the work. In the conventional type laser irradiating system used in the past, an operator must go back to the laser irradiating system each time the working position is changed, and the housing 4 is rotated and the irradiating position is shifted. In this connection, working efficiency is not very high, and heavier burden is also applied on the operator.

Regarding the accuracy of the horizontal reference plane, angular error must be within about 10 seconds. In the conventional type laser irradiating system as described above, the housing 4 is mounted on the base unit 2 via the bearings 3. The bearings 3 itself have shakiness because of its rotating function. For this reason, when the housing 4 is rotated, a rotation axis is often deviated. Oscillation occurs on the housing 4, and this leads to the oscillation of the horizontal reference plane, which is formed by the laser beam 13 irradiated from the housing 4. Thus, there has been such problem that it is difficult to maintain accuracy for the horizontal reference plane.

SUMMARY OF THE INVENTION

It is an object of the present invention to provide a laser irradiating system, by which there is no need for an operator to directly change an irradiating position of a laser irradiating system, and an irradiated laser beam can always form a horizontal reference plane even when there may be error in a rotating mechanism.

To attain the above object, the laser irradiating system according to the present invention comprises a light source for emitting a laser beam in elliptical shape, a light source holder for holding the light source, a base for rotatably supporting the light source holder, a first driving unit for rotating the light source holder, a deflecting optical means for deflecting the laser beam from the light source in a direction perpendicular to an optical axis, a rotator holder for holding the deflecting optical means and being rotatable around the optical axis of the light source, a cylindrical lens being arranged so that a center of the cylindrical lens is aligned with the optical axis and the laser beam from the deflecting optical means enters perpendicularly to the optical axis and for diffusing the transmitting laser beam to a fan-shaped laser beam, a control unit for controlling the first driving unit and a receiver for receiving a signal for remote-control operation, wherein an irradiating direction of the fan-shaped laser beam can be operated in remote control operation by the control unit based on a command signal received by the receiver. Also, the present invention provides the laser irradiating system as described above, wherein there is provided a second driving unit for relatively rotating the rotator holder with respect to the light source holder, and the control unit controls rotation of the rotator holder based on a command signal received by the receiver and changes a spreading angle or a thickness of the fan-shaped laser beam. Further, the present invention provides the laser irradiating system as described above, wherein the control unit can control the first driving unit and the second driving unit independently from each other. Also, the present invention provides the laser irradiating system as described above, wherein the control unit controls the light source holder and the rotator holder so as to rotate synchronously and relatively based on a command signal received by the receiver, and a spreading angle or a thickness of the fan-shaped laser beam can be changed while the fan-shaped laser beam is directed in an arbitrary direction. Further, the present invention provides the laser irradiating system as described above, wherein a signal transmitting medium of the command signal is a light beam, and the receiver is as many photodetection elements as required arranged along the circumference, wherein the control unit judges a direction in which the command signal is issued based on the photodetection status of a plurality of the photodetection elements, drives the first driving unit, and turns the irradiating direction of the fan-shaped laser beam to the direction, in which the command signal is issued. Also, the present invention provides the laser irradiating system as described above, wherein the deflecting optical means comprises a corner cube prism and a pentagonal prism. Further, the present invention provides the laser irradiating system as described above, wherein the deflecting optical means comprises a rhombic prism and a pentagonal prism.

DETAILED DESCRIPTION OF THE PREFERRED EMBODIMENTS

Description will be given below on the present invention referring to the drawings.

Figure 1:
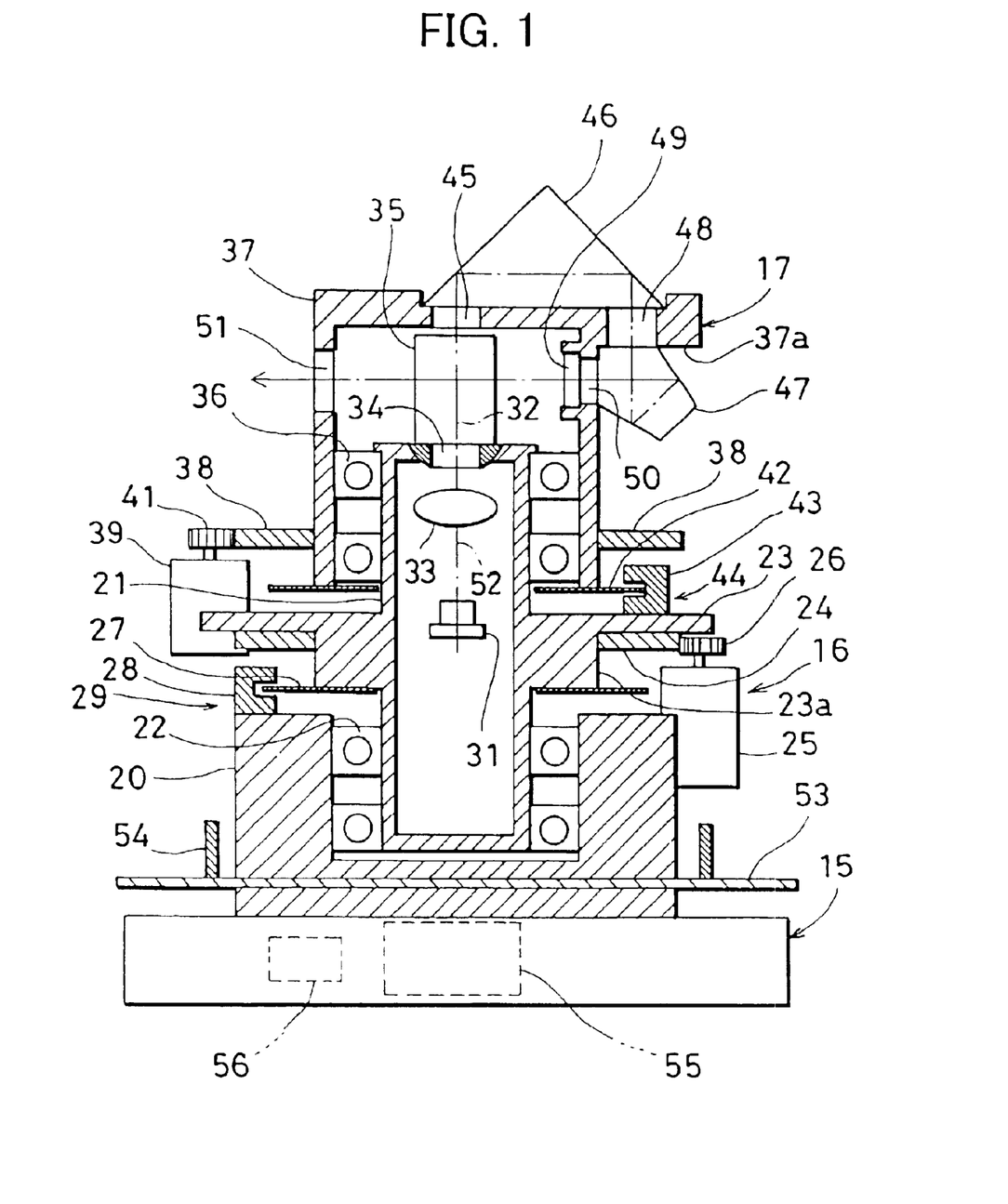
FIG. 1 is a cross-sectional view showing an embodiment of the present invention.
Figure 2:
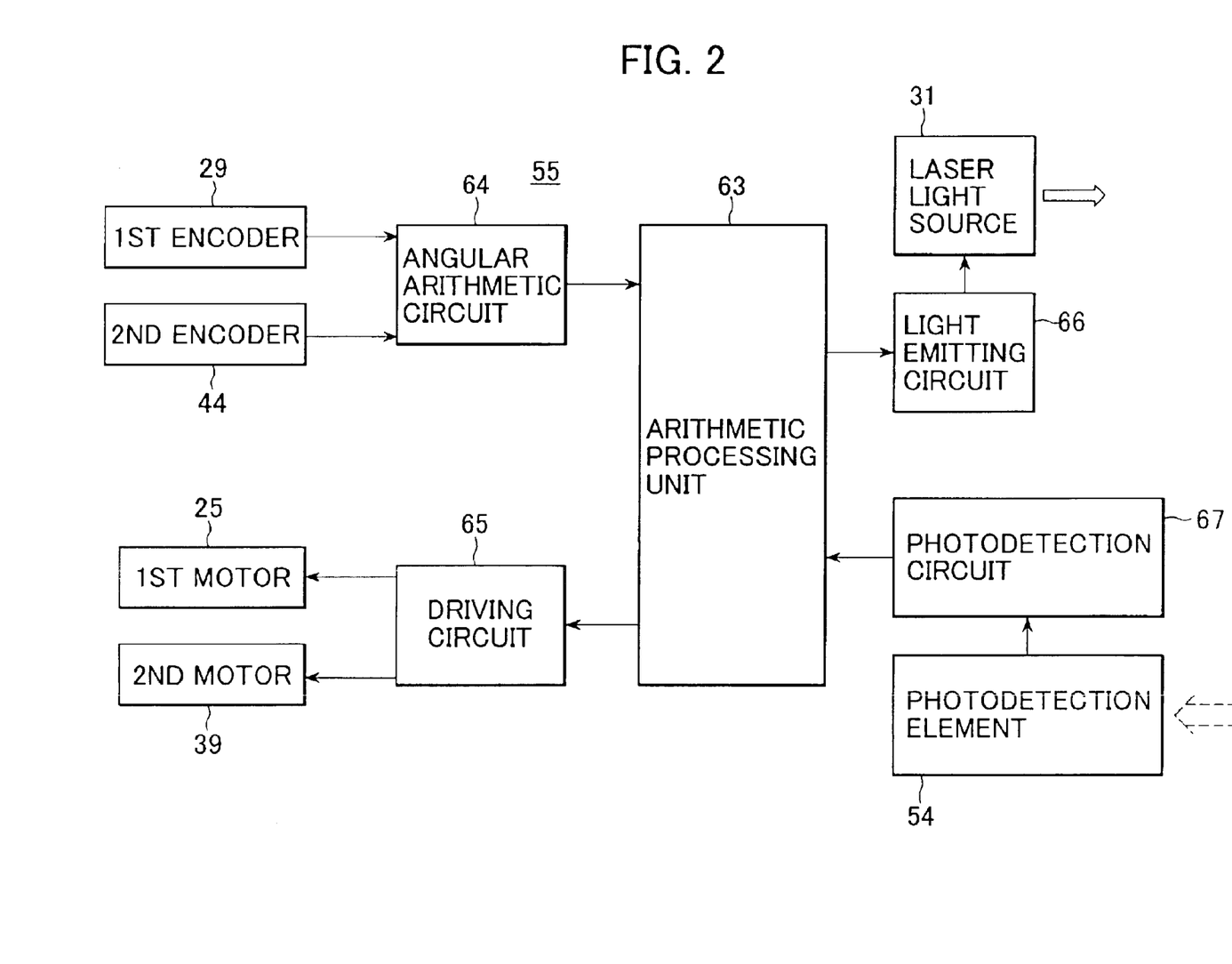
FIG. 2 is a control block diagram of the embodiment of the invention.

FIG. 1 and FIG. 2 each represents a general arrangement of a first embodiment of the present invention. In the figures, reference numeral 15 denotes a leveling unit, 16 denotes a main unit arranged on the leveling unit 15, and 17 denotes a laser beam irradiating unit rotatably mounted on the main unit.

The leveling unit 15 comprises a leveling mechanism (not shown). The main unit 16 can be leveled in a horizontal direction, i.e. an optical axis of the laser beam irradiating unit 17 can be leveled in a vertical direction.

Now, description will be given on the main unit 16.

A lower portion of a lens barrel 21 is rotatably mounted on a base 20 via bearings 22. A flange unit 23 is formed on the lens barrel 21, and a first driven gear 24 is fit and fixed on a boss 23a of the flange unit 23. A first motor 25 is mounted on the base 20. A first driving gear 26 is fit and fixed on an output shaft of the first motor 25, and the first driving gear 26 is engaged with the first driven gear 24.

A slit plate 27 is mounted on a lower surface of the boss 23a, and a detector 28 is mounted on an upper end of the base 20 so as to face to the slit plate 27. The slit plate 27 and the detector 28 make up a first encoder 29. A rotating angle of the lens barrel 21 is detected by the first encoder 29.

The lens barrel 21 is a light source holder for holding a light source unit. In the lens barrel 21, there are provided a laser light source 31 such as a semiconductor laser and an exit optical system such as a collimator lens 33 on an exit optical axis 32 of the laser light source 31. On an upper end of the lens barrel 21, a lower optical path hole 34 concentric with the exit optical axis 32 is formed. On upper side of the lens barrel 21, a cylindrical lens 35 is mounted on the exit optical axis 32.

Above the lens barrel 21, a rotator holder 37 is rotatably mounted via bearings 36, and a second driven gear 38 is engaged with the rotator holder 37. A second motor 39 is mounted on the flange unit 23, and a second driving gear 41 fixed on an output shaft of the second motor 39 is engaged with the second driven gear 38.

On a lower end of the rotator holder 37, a slit plate 42 is fixed. A detector 43 is mounted on the flange unit 23 so as to face to the slit plate 42. The detector 43 and the slit plate 42 make up a second encoder 44. By the second encoder 44, a relative angle of the rotator holder 37 to the lens barrel 21 is detected.

On the exit optical axis 32 at the center on an upper end of the rotator holder 37, an upper optical path hole 45 is formed, and a corner cube prism 46 is fixed on an upper end surface of the rotator holder 37. The rotator holder 37 has eaves 37a extending in a direction perpendicular to the exit optical axis 32. A pentagonal prism 47 is fixed at a corner formed by the eaves 37a and a side of the rotator holder 37.

The corner cube prism 46 and the pentagonal prism 47 fulfill the function as a deflecting optical means for projecting a laser beam 52 in a direction perpendicular to the cylindrical lens 35.

On the eaves 37a and the side of the rotator holder 37 where the pentagonal prism 47 comes into contact, an optical path hole 48 is formed in parallel to the exit optical axis 32, and an optical path hole 49 is formed so that the optical path crosses the exit optical axis 32 perpendicularly. An optical path hole 51 is formed on the rotator holder 37 so that the optical path hole 51 is positioned on an extension of an axis of the optical path hole 49, and a wedge prism 50 is disposed in the optical path hole 49.

The laser beam 52 emitted from the laser light source 31 is turned to a parallel beam by the collimator lens 33, and the laser beam 52 passes through the lower optical path hole 34, the cylindrical lens 35, and the upper optical path hole 45 and enters the corner cube prism 46. Then, the laser beam 52 is reflected in parallel by the corner cube prism 46. Next, the laser beam 52 passes through the optical path hole 48 and enters the pentagonal prism 47, and is reflected perpendicularly by the pentagonal prism 47. Because parallel reflection at the collimator lens 33 and perpendicular reflection at the pentagonal prism 47 are ensured, the reflected laser beam 52 always crosses the exit optical axis 32 perpendicularly even when there may be shakiness or vibration between the rotator holder 37 and the lens barrel 21. The laser beam 52 passing through the cylindrical lens 35 is diffused in fan-like shape and is projected through the optical path hole 51.

It is not possible to correct the tilting perpendicular to the surface of this paper, but shakiness of the rotator holder 37 with respect to the lens barrel 21 can be reduced to a negligible error by improving the fabrication accuracy.

On a lower portion of the base 20, a photodetection unit support plate 53 is fixed. On the photodetection unit support plate 53, as many photodetection elements 54 as required are arranged approximately without a gap between them around and on a circumference of the base 20. The photodetection elements 54 receive a signal light from a remote controller 70 as to be described later.

In the laser irradiating system, a control unit 55 and a power source unit 56 represented by a battery, etc. are arranged at adequate positions (inside the leveling unit 15 in the figure). An electric current is supplied from the power source unit 56 to the control unit 55, the first motor 25, the second motor 39, etc., and the control unit 55 drives and controls the first motor 25 and the second motor 39.

A photodetection signal from the photodetection element 54 is inputted to the control unit 55, and a light receiving direction can be identified from photodetection status of a plurality of the photodetection elements 54, which receive the light.

Referring to FIG. 2, description will be given on an arrangement of the control unit 55.

A rotation angle signal of the lens barrel 21 detected by the first encoder 29 and a relative rotation angle signal between the lens barrel 21 and the rotator holder 37 detected by the second encoder 44 are inputted to an angular arithmetic circuit 64. A rotation angle of the lens barrel 21 and a relative rotation angle between the lens barrel 21 and the rotator holder 37 are calculated, and the result of calculation is inputted to an arithmetic processing unit 63. Based on a command signal from the arithmetic processing unit 63, the first motor 25 and the second motor 39 are driven and controlled by a driving circuit 65. Light emitting status of the laser light source 31 is controlled by the arithmetic processing unit 63 via a light emitting circuit 66. When the signal light is received at the photodetection element 54, the photodetection signal is inputted to the arithmetic processing unit 63 via the photodetection circuit 67, and an information transmitted by the photodetection signal is judged.

Figure 3:
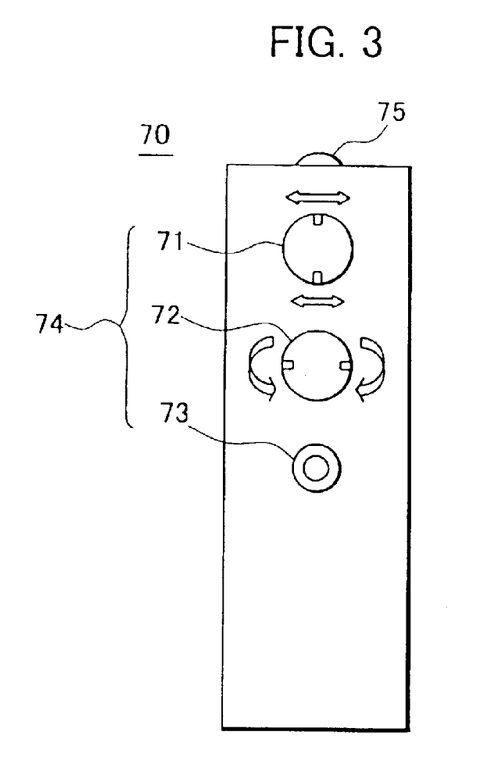
FIG. 3 is an explanation drawing of a remote controller in the embodiment of the invention.

Referring to FIG. 3, description will be given on an example of the remote controller 70.

The remote controller 70 comprises an operation unit 74 (which comprises a spreading angle adjusting button 71 for adjusting a spreading angle of the laser beam, an irradiating direction shifting button 72, and a 0 (zero) irradiating direction determining button 73) and a transmitter 75 for transmitting a signal light such as infrared light. The 0 irradiating direction is defined as a direction, in which the signal light from the remote controller 70 is emitted.

When an upper portion or a lower portion of the spreading angle adjusting button 71 is pressed, a signal light for changing the spreading angle is issued. When a left portion or a right portion of the irradiating direction shifting button 72 is pressed, a signal light for shifting the irradiating direction is issued. When the 0 irradiating direction determining button 73 is pressed, the irradiating direction is shifted to a preset direction, for example, a direction toward the remote controller 70, in which the signal light has been issued.

Figure 4:
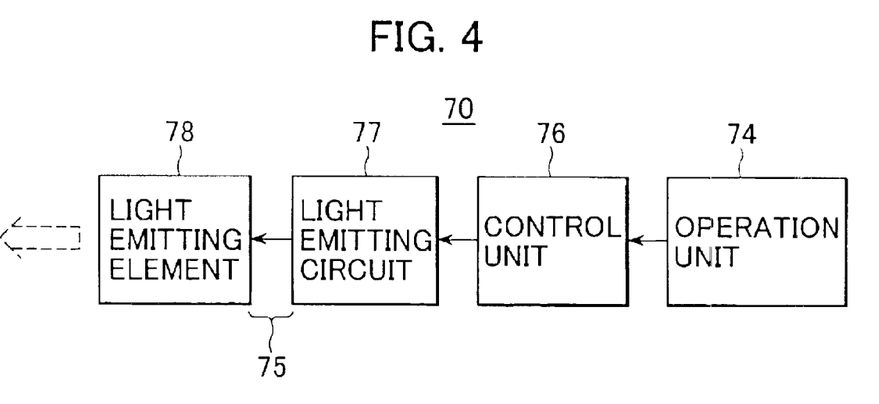
FIG. 4 is a control block diagram of the remote controller.

FIG. 4 is a control block diagram of the remote controller 70.

When a predetermined operation button of the operation unit 74 is pressed, a control unit 76 judges which operation button has been operated in which mode. Then, a light emitting command corresponding to an operation mode is issued to a light emitting circuit 77. A light emitting element 78 is driven by the light emitting circuit 77, and a signal light is emitted from the light emitting element 78.

Now, description will be given on operation.

When an electric current is supplied to the first motor 25 and, while the first driving gear 26 is in locked state, an electric current is supplied to the second motor 39 and when the second driving gear 41 is rotated, the rotator holder 37, i.e. the laser beam irradiating unit 17, is relatively rotated with respect to the lens barrel 21 via the second driven gear 38.

A luminous flux of the laser beam 52 emitted from the laser light source 31 (semiconductor laser element) has an elliptical cross-section because of the structure of the laser element with a crystal sandwiched in it. When the laser light irradiating unit 17 is rotated, the corner cube prism 46 and the pentagonal prism 47 are also rotated, and the cross-section of the luminous flux of the laser beam 52 entering the cylindrical lens 35 is rotated. Description will be given below on status of the luminous flux of the laser beam 52 entering the cylindrical lens 35 and on status of a fan-shaped laser beam irradiated from the cylindrical lens 35 referring to FIG. 5 and FIG. 6.

Figure 5A:
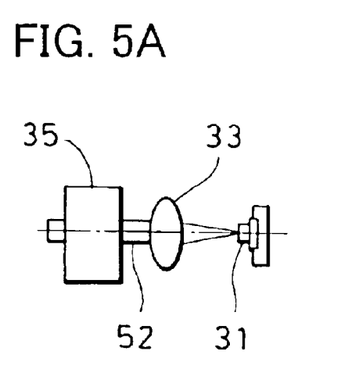
FIG. 5(A), FIG. 5(B) and FIG. 5(C) each represents a drawing to explain the change of a spreading angle of a fan-shaped laser beam in the embodiment of the invention.
Figure 5B:
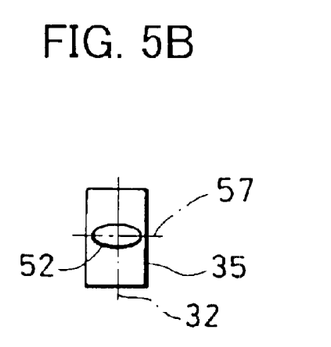
Figure 5C:
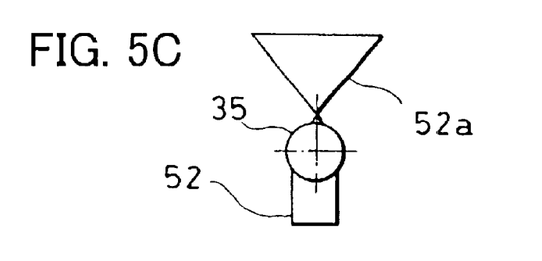
Figure 6A:
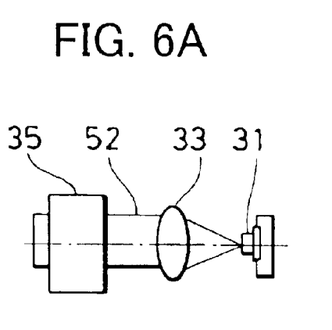
FIG. 6(A), FIG. 6(B) and FIG. 6(C) each represents a drawing to explain the change of a spreading angle of a fan-shaped laser beam in the embodiment of the invention.
Figure 6B:
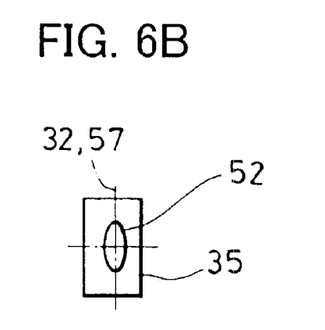
Figure 6C:
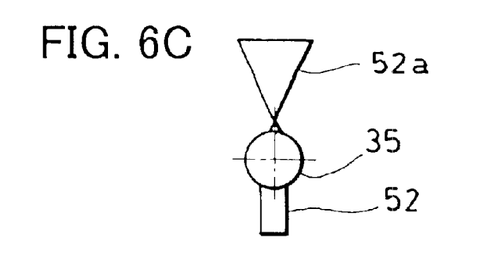

In each of FIG. 5 and FIG. 6, (A) represents a front view, (B) is a side view seen from left, and (C) is a plan view.

As described above, the luminous flux of the laser beam 52 has an elliptical cross-section, and the luminous flux of the laser beam 52 turned to a parallel beam by the collimator lens 33 has also an elliptical cross-section.

In FIG. 5, the laser beam 52 is projected to the cylindrical lens 35 so that a longer diameter 57 of the luminous flux cross-section crosses perpendicularly a center line (the exit optical axis 32) of the cylindrical lens 35. When the laser beam irradiating unit 17 is relatively rotated at an angle of 90° with respect to the lens barrel 21 as shown in FIG. 6, the luminous flux of the laser beam 52 is rotated at an angle of 90° around an optical axis. The luminous flux enters in such manner that the longer diameter 57 of the luminous flux cross-section runs in parallel to or is aligned with the center line (the exit optical axis 32) of the cylindrical lens 35.

After passing through the cylindrical lens 35, the laser beam 52 is irradiated as a fan-shaped laser beam 52a.

As shown in FIG. 5, when the longer diameter 57 of the luminous flux cross-section crosses perpendicularly the exit optical axis 32, a spreading angle of the fan-shaped laser beam 52a is increased, and a line width is narrowed down. Because the line width is narrow and the spreading angle is large, it is suitable for operation at short distance. In the operation at long distance, luminance is extremely reduced because the spreading angle is large.

As shown in FIG. 6, when the longer diameter 57 of the luminous flux cross-section is aligned with the exit optical axis 32, the spreading angle of the fan-shaped laser beam 52a is small and the line width is large. However, as an exit diameter is large at a light emitting point and the spreading angle of the laser beam is small, the line width is not increased. So, this is suitable for the operation at long distance. Further, the spreading angle of the fan-shaped laser beam 52a is small, and this is suitable for the operation at long distance.

Therefore, by controlling an amount of relative rotation of the laser beam irradiating unit 17 with respect to the lens barrel 21, it is possible to adjust the spreading angle of the irradiated fan-shaped laser beam 52a. The line width of the fan-shaped laser beam 52a can be changed within the range from the shorter diameter to the longer diameter of the laser beam 52.

Further, when a rotating mechanism for adjusting the spreading angle of the fan-shaped laser beam 52a and a rotating mechanism for adjusting the irradiating direction are provided, the spreading of the fan-shaped laser beam and the irradiating line width of the irradiation can be set adequately to the values as required. Further, by providing a driving motor and a photodetection sensor for control, it is possible to perform remote-control operation.

The rotation of the lens barrel 21 is restrained by the first motor 25. As a result, with the rotation of the laser beam irradiating unit 17, the irradiating direction of the fan-shaped laser beam 52a is also shifted. The amount of relative rotation is detected by the second encoder 44. Based on the result of the detection of the amount of relative rotation from the second encoder 44, the spreading angle of the fan-shaped laser beam 52a can be set.

Next, when an electric current is supplied to the second motor 39 and, while the second driving gear 41 is in locked state, an electric current is supplied to the first motor 25 and when the first driving gear 26 is rotated, the lens barrel 21 and the laser beam irradiating unit 17 are rotated integrally with each other. Thus, without changing the spreading angle of the fan-shaped laser beam 52a, the irradiating direction of the fan-shaped laser beam 52a can be shifted. Further, the amount of rotation of the lens barrel 21 is detected by the first encoder 29. Based on the result of the detection of the first encoder 29, the irradiating direction of the fan-shaped laser beam 52a is set.

When the laser beam irradiating unit 17 is rotated in a right direction, for instance, by the second motor 39 and the lens barrel 21 is rotated in a left direction at equal angular velocity by the first motor 25, it is possible to change only the spreading angle of the fan-shaped laser beam 52a without shifting the irradiating direction of the fan-shaped laser beam 52a.

Further, when rotating angular velocity of the laser beam irradiating unit 17 moved by the second motor 39 and the rotating angular velocity of the lens barrel 21 moved by the first motor 25 are set to values unequal to each other, the irradiating direction of the fan-shaped laser beam 52a can be shifted while changing the spreading angle of the fan-shaped laser beam 52a. In this case, based on the result of the detection of the amount of rotation from the second encoder 44, the spreading angle of the fan-shaped laser beam 52a can be calculated or set. From a deviation of the second encoder 44 and the first encoder 29, the amount of shifting of the irradiating direction of the fan-shaped laser beam 52a can be calculated or set.

The shifting of the irradiating direction of the fan-shaped laser beam 52a and the change of the spreading angle of the fan-shaped laser beam 52a can be carried out by the remote controller 70, which uses infrared light or the like as a signal transmitting medium. Apart from the remote controller 70, an operation unit may be provided to the laser irradiating system itself, and various setting may be made such as the setting of the spreading angle of the fan-shaped laser beam 52a by the operation unit. Or, radio communication may be used as the signal transmitting medium.

The remote controller 70 is designed in such manner that a signal light with a pattern corresponding to the shifting of the irradiating direction of the fan-shaped laser beam 52a is issued by operating the irradiating direction shifting button 72, and a signal light with a pattern corresponding to the change of the spreading angle of the fan-shaped laser beam 52a can be issued by operating the spreading angle adjusting button 71. The signal light from the remote controller 70 is received by the photodetection element 54. The signal light received by the photodetection element 54 is converted by photo-electric conversion and is inputted to the control unit 55. The pattern of the signal light is analyzed and judged at the control unit 55. Based on the result of judgement, the relative rotating angle of the laser beam irradiating unit 17 and the amount of rotation of the lens barrel 21, etc. are calculated. Based on the result of calculation, the first motor 25 and the second motor 39 are driven and controlled.

Further, the remote controller 70 uses an LED or the like as a signal source. The signal may be transmitted by modulating the signal light.

As described above, the spreading angle, the line width, and the irradiating direction of the fan-shaped laser beam 52a can be adjusted by remote-control operation, and it is possible to have an optical irradiating condition of the laser beam suitable for the operation.

The photodetection element 54 is provided all over the circumference of the base 20. The signal light from the remote controller 70 is received by the plurality of photo-detection elements 54. The control unit 55 can identify the direction of the remote controller 70 by calculating the center of the weighted position of the photodetection amount of the plurality of photodetection elements 54. Base on the calculation result, the first motor 25 may be driven and controlled in such manner that the irradiating direction of the fan-shaped laser beam 52a is aligned with the direction of the remote controller 70. This corresponds to the case where the photodetection element 54 receives the signal light operated by the 0 irradiating direction determining button 73 of the remote controller 70.

When the irradiating direction of the fan-shaped laser beam 52a is shifted in response to the photodetection status of the photodetection element 54, a command issued from the remote controller 70 may simply include a command on the spreading angle of the fan-shaped laser beam 52a and the change of the spreading angle. This makes it possible to have the control system in simple design.

Figure 7:
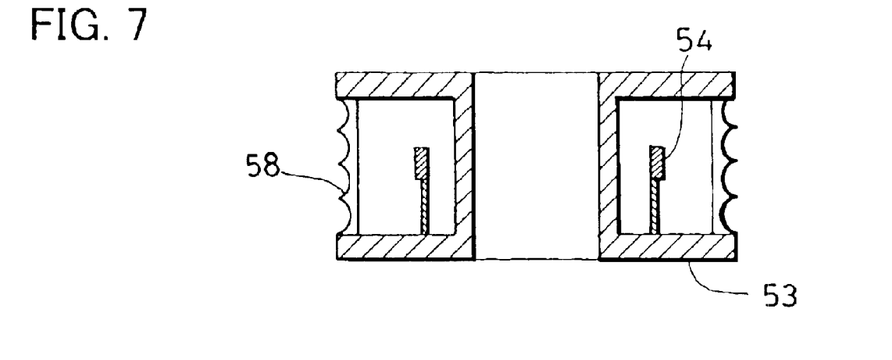
FIG. 7 is a cross-sectional view of a variation of a photodetection unit in the embodiment of the present invention.
Figure 8:
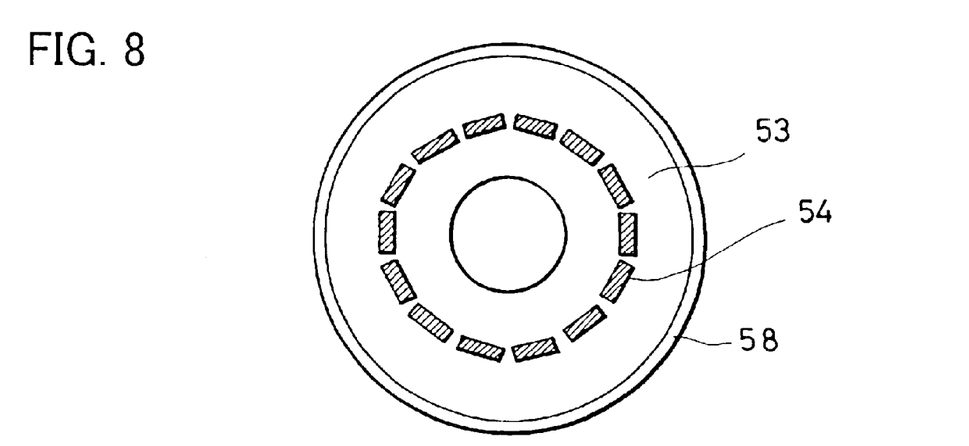
FIG. 8 is a plan view of the photodetection unit.

FIG. 7 and FIG. 8 each represents a variation of the photodetection unit.

In the above variation, the photodetection elements 54 are accommodated in a condenser lens 58 of cylindrical shape. The condenser lens 58 guides the signal light coming from a vertical direction (up-to-bottom direction) toward the photodetection elements 54. The condenser lens 58 is designed to have such a cross-section that a plurality of cylindrical shapes are serially aligned in a longitudinal direction, and the signal light from the vertical direction can enter there.

By providing the condenser lens 58 in such manner, the photodetection elements 54 can receive the signal light from all over the circumference and from the vertical direction. This extensively increases the range of operation by the remote controller 70. The photodetection element 54 can be designed in water-tight structure by the condenser lens 58, and this makes it possible to carry out the operation even in weather condition such as rainy weather.

The leveling unit 15 may be provided with such automatic leveling function that a level adjusting bolt (not shown) is rotated by a leveling motor (not shown). Also, it may be designed in such manner that the leveling motor is controlled by the control unit 55. Then, the leveling operation can be carried out in remote-control operation by the remote controller 70, and it is possible to form a reference plane by the laser beam, which is tilted with respect to the horizontal or the vertical direction at a predetermined angle.

Figure 9:
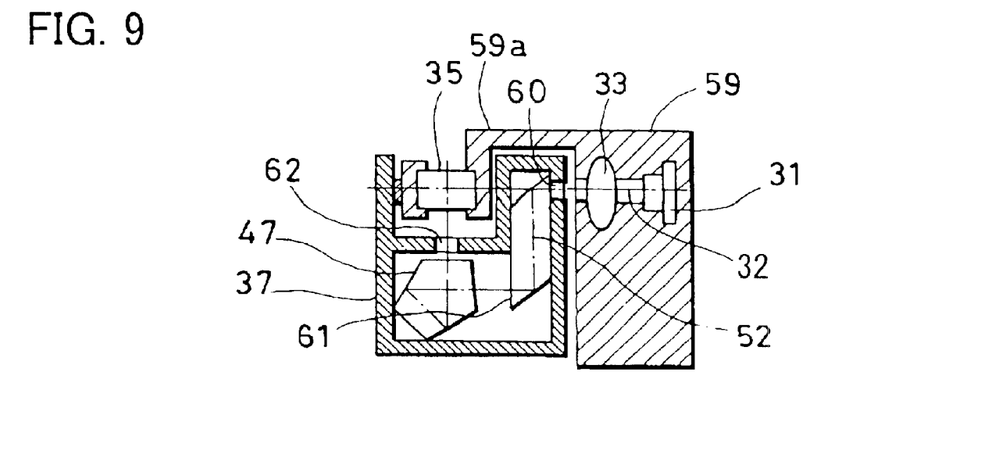
FIG. 9 is a cross-sectional view of an essential portion of another embodiment of the present invention.

FIG. 9 shows another embodiment of the present invention.

In this another embodiment, a rhombic prism 61 is used instead of the corner cube prism 46.

A laser light source 31 and a collimator lens 33 are arranged on a base 59. An arm unit 59a is provided so as to overhang from the base 59. At a tip of the arm unit 59a, a cylindrical lens 35 arranged on an exit optical axis 32 of the laser light source 31 is held. A rotator holder 37 is designed in recessed shape and has a rotation center on the exit optical axis 32 of the laser light source 31 and is rotatably mounted at the tip of the arm unit 59a. Inside the rotator holder 37, there are provided the rhombic prism 61 and the pentagonal prism 47. Optical path holes 60 and 62 are respectively formed on the rotator holder 37 at positions where the laser beam 52 enters the rhombic prism 61 and at another position where the laser beam exits from the pentagonal prism 47.

After entering the rhombic prism 61, the laser beam 52 is reflected in such direction that an incident optical axis is made parallel to an optical axis of the reflected light at the rhombic prism 61. Further, the laser beam 52 is reflected in a perpendicular direction by the pentagonal prism 47 and enters the cylindrical lens 35 so as to cross perpendicularly the exit optical axis 32.

After passing through the cylindrical lens 35, the laser beam 52 is irradiated as a fan-shaped laser beam 52a as described above.

In this embodiment, the rhombic prism 61 and the pentagonal prism 47 fulfill the function as a deflecting optical means. The rhombic prism 61 is smaller than the corner cube prism 46 and it can provide the beam evenly with respect to a rotation axis. As a result, good balance is kept in the rotator holder 37, and this contributes to the reduction of vibration or oscillation of the rotation axis during rotation.

The system according to the present invention comprises a light source for emitting a laser beam in elliptical shape, a light source holder for holding the light source, a base for rotatably supporting the light source holder, a first driving unit for rotating the light source holder, a deflecting optical means for deflecting the laser beam from the light source in a direction perpendicular to an optical axis, a rotator holder for holding the deflecting optical means and being rotatable around the optical axis of the light source, a cylindrical lens being arranged so that a center of the cylindrical lens is aligned with the optical axis and the laser beam from the deflecting optical means enters perpendicularly to the optical axis and for diffusing the transmitting laser beam to a fan-shaped laser beam, a control unit for controlling the first driving unit and a receiver for receiving a signal for remote-control operation, wherein an irradiating direction of the fan-shaped laser beam can be operated in remote control operation by the control unit based on a command signal received by the receiver. As a result, there is no need for the operator to change the irradiating position of the laser irradiating system directly, and this contributes to the improvement of the working efficiency.

There is provided a second driving unit for relatively rotating the rotator holder with respect to the light source holder, and the control unit controls rotation of the rotator holder based on a command signal received by the receiver and changes a spreading angle or a thickness of the fan-shaped laser beam. As a result, the spreading angle of the fan-shaped laser beam and the thickness of a reference line can be changed. Also, the spreading angle of the fan-shaped laser beam and the thickness of the reference line can be changed by remote-control operation. This contributes to the improvement of the working efficiency.

Also, a signal transmitting medium of a command signal is a light beam, and the receiver is as many photodetection elements as required arranged along the circumference, wherein the control unit judges a direction in which the command signal is issued based on the photodetection status of a plurality of the photodetection elements, drives the first driving unit and turns the irradiating direction of the fan-shaped laser beam to the direction, in which the command signal is issued. As a result, there is no need for the operator to perform complicated operation of the remote controller. By simply directing the remote controller toward the laser irradiating system and by issuing a command signal, the fan-shaped laser beam is moved to the position of the operation. Thus, operation can be carried out without stopping and at high working efficiency.

What is claimed is:

1. A laser irradiating system, comprising a light source for emitting a laser beam in elliptical shape, a light source holder for holding said light source, a base for rotatably supporting said light source holder, a first driving unit for rotating said light source holder, a deflecting optical means for deflecting the laser beam from said light source in a direction perpendicular to an optical axis, a rotator holder for holding said deflecting optical means and being rotatable around the optical axis of said light source, a cylindrical lens being arranged so that a center of said cylindrical lens is aligned with said optical axis and the laser beam from said deflecting optical means enters perpendicularly to the optical axis and for diffusing the transmitting laser beam to a fan-shaped laser beam, a control unit for controlling said first driving unit and a receiver for receiving a signal for remote-control operation, wherein an irradiating direction of said fan-shaped laser beam can be operated in remote control operation by said control unit based on a command signal received by said receiver.

2. A laser irradiating system according to claim 1, wherein there is provided a second driving unit for relatively rotating said rotator holder with respect to said light source holder, and said control unit controls rotation of said rotator holder based on a command signal received by said receiver and changes a spreading angle or a thickness of the fan-shaped laser beam.

3. A laser irradiating system according to claim 2, wherein said control unit can control said first driving unit and said second driving unit independently from each other.

4. A laser irradiating system according to claim 3, wherein said control unit controls said light source holder and said rotator holder so as to rotate synchronously and relatively based on a command signal received by said receiver, and a spreading angle or a thickness of the fan-shaped laser beam can be changed while the fan-shaped laser beam is directed in an arbitrary direction.

5. A laser irradiating system according to claim 1, wherein a signal transmitting medium of the command signal is a light beam, and said receiver is as many photodetection elements as required arranged along the circumference, wherein said control unit judges a direction in which the command signal is issued based on the photodetection status of a plurality of said photodetection elements, drives said first driving unit, and turns the irradiating direction of the fan-shaped laser beam to the direction, in which the command signal is issued.

6. A laser irradiating system according to claim 1, wherein said deflecting optical means comprises a corner cube prism and a pentagonal prism.

7. A laser irradiating system according to claim 1, wherein said deflecting optical means comprises a rhombic prism and a pentagonal prism.

* * * * *